United States Patent
Roth

(10) Patent No.: US 7,710,630 B2
(45) Date of Patent: May 4, 2010

(54) MULTI-PRIMARY COLOR PROJECTION DISPLAY

(75) Inventor: Shmuel Roth, Petach Tikva (IL)

(73) Assignee: Genoa Color Technologies Ltd., Hod Hasharon (IL)

( * ) Notice: Subject to any disclaimer, the term of this patent is extended or adjusted under 35 U.S.C. 154(b) by 55 days.

(21) Appl. No.: 11/791,796

(22) PCT Filed: Nov. 29, 2005

(86) PCT No.: PCT/IL2005/001273

§ 371 (c)(1),
(2), (4) Date: Aug. 7, 2008

(87) PCT Pub. No.: WO2006/057001

PCT Pub. Date: Jun. 1, 2006

(65) Prior Publication Data

US 2009/0021821 A1    Jan. 22, 2009

Related U.S. Application Data

(60) Provisional application No. 60/631,182, filed on Nov. 29, 2004.

(51) Int. Cl.
G02F 1/03 (2006.01)
G02F 1/1335 (2006.01)
G02B 27/14 (2006.01)
H04N 9/30 (2006.01)
G03B 21/26 (2006.01)

(52) U.S. Cl. .................... 359/247; 359/636; 349/106; 348/791; 353/34

(58) Field of Classification Search ................ 359/634, 359/636–640, 669, 629, 624–625, 247, 831, 359/833–834; 353/31, 33–34, 70, 84, 99; 349/5–9, 106; 348/744, 758, 790–791
See application file for complete search history.

(56) References Cited

U.S. PATENT DOCUMENTS

| | | | |
|---|---|---|---|
| 5,565,933 | A | 10/1996 | Reinsch |
| 6,331,912 | B1 | 12/2001 | Au-Yeung et al. |
| 6,643,064 | B2 | 11/2003 | Huang et al. |
| 6,870,523 | B1 | 3/2005 | Ben-David et al. |
| 2002/0001135 | A1* | 1/2002 | Berman et al. ............. 359/640 |
| 2002/0191235 | A1* | 12/2002 | O'Connor et al. ............. 359/9 |

FOREIGN PATENT DOCUMENTS

WO    WO 2004/010407    1/2004

OTHER PUBLICATIONS

International Search Report for International Application No. PCT/IL05/01273 mailed Jun. 28, 2006.
Sharp et al., "LCoS Projection Color Management Using Retarder Stack Technology", Elsevier Science vol. 23, 2002, pp. 121-128.

* cited by examiner

*Primary Examiner*—Scott J Sugarman
*Assistant Examiner*—Dawayne A Pinkney
(74) *Attorney, Agent, or Firm*—Pearl Cohen Zedek Latzer, LLP

(57) ABSTRACT

Embodiments of the present invention include a method, apparatus and/or system of producing a color image using four or more primary colors. The apparatus, according to some demonstrative embodiments of the invention, may include an optical arrangement to selectively split polychromatic light into at least four primary-color light beams, and to direct the at least four primary-color light beams towards at least four reflective spatial light modulators, respectively. Other embodiments are described and claimed.

19 Claims, 5 Drawing Shees

MULTI-PRIMARY COLOR PROJECTION DISPLAY

CROSS-REFERENCE TO RELATED APPLICATIONS

This application is a National Phase Application of PCT International Application No. PCT/IL2005/001273, entitled "MULTI-PRIMARY COLOR PROJECTION DISPLAY". International Filing Date Nov. 29, 2005, published on Jun. 1, 2006 as International Publication No. WO 2006/057001, which in turn claims priority from U.S. Provisional Patent Application No. 60/631,182, filed Nov. 29, 2004, both of which are incorporated herein by reference in their entirety.

FIELD OF THE INVENTION

The invention relates generally to color display devices and methods of displaying color images and, more particularly, to multi-primary color displays using reflective Spatial Light Modulators (SLMs).

BACKGROUND

Various types of color display technologies are known in the art. For example, there are CRT display systems, LCD systems, and projection display systems. In front projection displays, the projected images are viewed from a reflective viewing screen. In rear projection displays, the projected images are viewed through a transmissive viewing screen.

To produce color images, existing display devices use three primary colors, typically, red green and blue, collectively referred to as RGB. In simultaneous projection display systems, the three primary color components of the image are modulated and displayed simultaneously using one or more Spatial Light Modulators (SLMs).

Three primary projection displays implementing color selective retarder stack technology, e.g., as manufactured by Colorlink Incorporated, 2477 55th St., Boulder, Colo., 80301, USA, are described in "*LCoS projection color management using retarder stack technology*"; Gary Sharp, Michael Robinson, Jianmin Chen, Jonathan Birge; *Elsevier Science Volume* 23, 2002, pp 121-128 (Reference 1), the entire disclosure of which is incorporated herein by reference.

FIG. 1 schematically illustrates an optical configuration 100 of a RGB projection device implementing three transmissive reflective Liquid Crystal Display (LCD) panels to produce a color image, as described in Reference 1.

The light from a lamp (not shown) passes through an input polarizer 101 to obtain an s-polarized white light beam. Polarizer 101 typically includes a polarization conversion system followed by a clean up Polarized Beam Splitter (PBS), a sheet polarizer, or a wire-grid polarizer, as are known in the art.

An input green/magenta filter 102 rotates the polarization, e.g., from s-polarization to p-polarization, of a green part of the spectrum of the light received from polarizer 101. The s-polarization of other parts of the spectrum may be maintained.

Configuration 100 also includes a PBS 103 to transmit p-polarized light, e.g., the green light received from filter 102; and to reflect the remaining part of the light, as is known in the art. The light reflected by PBS 103 may include blue, red, and inter-primary light.

Configuration 100 also includes a single layer retarder 104. Retarder 104 may have half-wave retardation in the green and zero-orientation, for correcting skew rays, as is known in the art. Retarder 104 may enhance throughput of the green light.

Configuration 100 also includes a PBS 105, a retarder 106, and a reflective LC spatial light modulator 107. PBS 105 transmits the p-polarized green light received from retarder 104 towards retarder 106. Retarder 106 may include a skew-ray correcting 0-oriented retarder with quarter-wave retardation in the green spectrum. Modulator 107 may modulate and reflect the green light received from retarder 106, while rotating the polarization of the reflected light, e.g., back to s-polarization. PBS 105 may reflect the s-polarized green light towards a single layer retarder 108. Retarder 108 may have half-wave retardation in the green and zero-orientation, for correcting skew rays. Retarder 108 may enhance contrast.

Configuration 100 also includes a Red-Blue ColorSelect™ filter 112 to rotate the polarization, e.g., from s-polarization to p-polarization, of a red part of the spectrum of the light reflected by PBS 103, while maintaining the s-polarization of the blue part of the spectrum. Filter 112 may function as a zero-oriented half-wave retarder in the blue spectrum, and a π/4 oriented half-wave retarder in the red spectrum, e.g., in order to compensate for skew-ray.

Configuration 100 also includes a PBS 113, two reflective LC spatial light modulators 114 and 115, and a Red/Blue ColorSelect™ filter 116. PBS 113 may transmit the p-polarized red light received from filter 112 towards modulator 115, and reflect the s-polarized blue light towards modulator 114. Modulator 114 may modulate and reflect red light received from PBS 113, while rotating the polarization of the reflected light, e.g., back to s-polarization. Modulator 115 may modulate and reflect blue light received from PBS 113, while rotating the polarization of the reflected light to p-polarization. PBS 113 may reflect the s-polarized red light towards filter 116. PBS 113 may also transmit the p-polarized blue light towards filter 116. Filter 116 may rotate the polarization, e.g., from s-polarization to p-polarization, of the red light received from PBS 113, while maintaining the p-polarization of the blue light.

Configuration 110 also includes a combining PBS 109 to combine the red, blue, and green light beams, by transmitting the p-polarized red and blue light beams towards a filter 110; and reflecting the s-polarized green light beam towards filter 110. Filter 110 includes a green/magenta filter to transmit primary blue and red-p-polarized light, while rotating the polarization of the primary green and inter-primary bands back to p-polarization.

Configuration 100 also includes a clean-up polarizer 111 to enhance contrast, and block inter-primary bands.

It will be appreciated by those skilled in the art, that in order to achieve desired green color coordinates, filter 102 has a parallel-polarizer blocking band that captures only a part of a green-yellow spectrum of the white light.

SUMMARY OF SOME DEMONSTRATIVE EMBODIMENTS OF THE INVENTION

Some demonstrative embodiments of the invention include a method, apparatus and/or system of producing a color image using four or more primary colors.

According to some demonstrative embodiments of the invention, the apparatus may include, a first color selective rotator to selectively rotate the polarization of polychromatic light, and provide a first light beam including light of first and second spectral ranges in a first polarization state, and light of third and fourth spectral ranges in a second polarization state, the first, second, third and fourth spectral ranges corresponding to first, second third and fourth primary colors, respectively.

According to some demonstrative embodiments of the invention, the device may also include a beam splitter to split the first light beam into a second light beam including light of the first and second spectral ranges in the first polarization state, and a third light beam including light of the third and fourth spectral ranges in the second polarization state.

According to some demonstrative embodiments of the invention, the device may also include a second color selective rotator to selectively rotate the polarization of the second light beam to include light of the first spectral range in the second polarization state, and light of the second spectral range in the first polarization state.

According to some demonstrative embodiments of the invention, the device may also include first and second reflective spatial light modulator panels including first and second arrays of pixel elements, respectively.

According to some demonstrative embodiments of the invention, the device may also include a first beam divider/combiner to direct the light of the first spectral range in the second polarization state towards the first reflective panel, and the light of the second spectral range in the first polarization state towards the second reflective panel.

According to some demonstrative embodiments of the invention, the device may also include a third color selective rotator to selectively rotate the polarization of the third light beam to include light of the third spectral range in the first polarization state, and light of the fourth spectral range in the second polarization state.

According to some demonstrative embodiments of the invention, the device may also include third and fourth reflective spatial light modulator panels including third and fourth arrays of pixel elements, respectively.

According to some demonstrative embodiments of the invention, the device may also include a second beam divider/combiner to direct the light of the third spectral range in the first polarization state towards the third reflective panel, and the light of the fourth spectral range in the second polarization state towards the fourth reflective panel.

According to some demonstrative embodiments of the invention, the first reflective panel may to modulate the light of the first spectral range in the second polarization state and reflect a first modulated light beam in the first polarization state carrying a first primary color image component of the color image; the second reflective panel may to modulate the light of the second spectral range in the first polarization state and reflect a second modulated light beam in the second polarization state carrying a second primary color image component of the color image; the third reflective panel may modulate the light of the third spectral range in the first polarization state and reflect a third modulated light beam in the second polarization state carrying a third primary color image component of the color image; and/or the fourth reflective panel may modulate the light of the fourth spectral range in the second polarization state and reflect a fourth modulated light beam in the first polarization state carrying a fourth primary color image component of the color image.

According to some demonstrative embodiments of the invention, the device may also include a fourth color selective rotator. The first beam divider/combiner may direct both the first and second modulated light beams towards the fourth rotator. The fourth rotator may selectively rotate the polarization of the first modulated light beam to the second polarization state.

According to some demonstrative embodiments of the invention, the device may also include a fifth color selective rotator. The second beam divider/combiner may direct both the third and fourth modulated colored light beams towards the fifth rotator. The fifth rotator may selectively rotate the polarization of the third modulated light beam to the first polarization state.

According to some demonstrative embodiments of the invention, the device may also include a beam combiner to direct the first, second, third and fourth modulated color light beams in an output direction.

According to some demonstrative embodiments of the invention, the device may also include a sixth color selective rotator to rotate the polarization of two of the first, second, third, and fourth modulated light beams.

According to some demonstrative embodiments of the invention, at least one of the first and second beam divider/combiners may include a polarized beam splitter.

According to some demonstrative embodiments of the invention, each of the first, second, third, and fourth primary colors may include a corresponding one of green, yellow, red and blue primary colors.

According to some demonstrative embodiments of the invention, the device may also include comprising a projection lens to project the first, second, third and fourth modulated color light beams towards a screen.

According to some demonstrative embodiments of the invention, the device may also include a controller to separately activate each of the four or more spatial light modulators to produce four or more respective reflective patterns corresponding to four or more primary components, respectively, of a signal representing the color image.

According to some demonstrative embodiments of the invention, the device may also include comprising a converter to convert a three-primary color input signal into the signal representing the color image.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
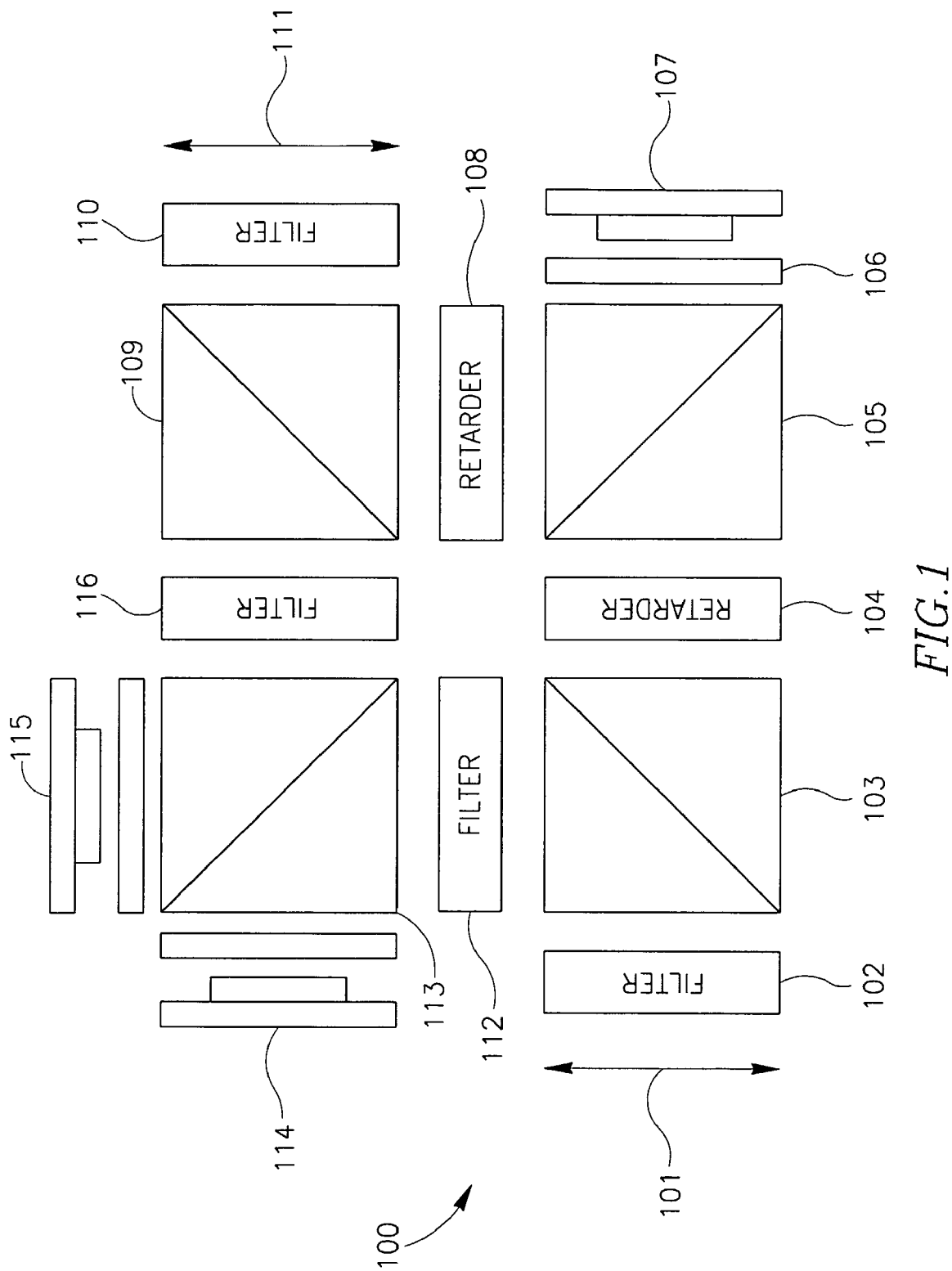
FIG. 1 is a schematic illustration of an optical configuration of a conventional RGB projection display device.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF DEMONSTRATIVE EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Figure 2:
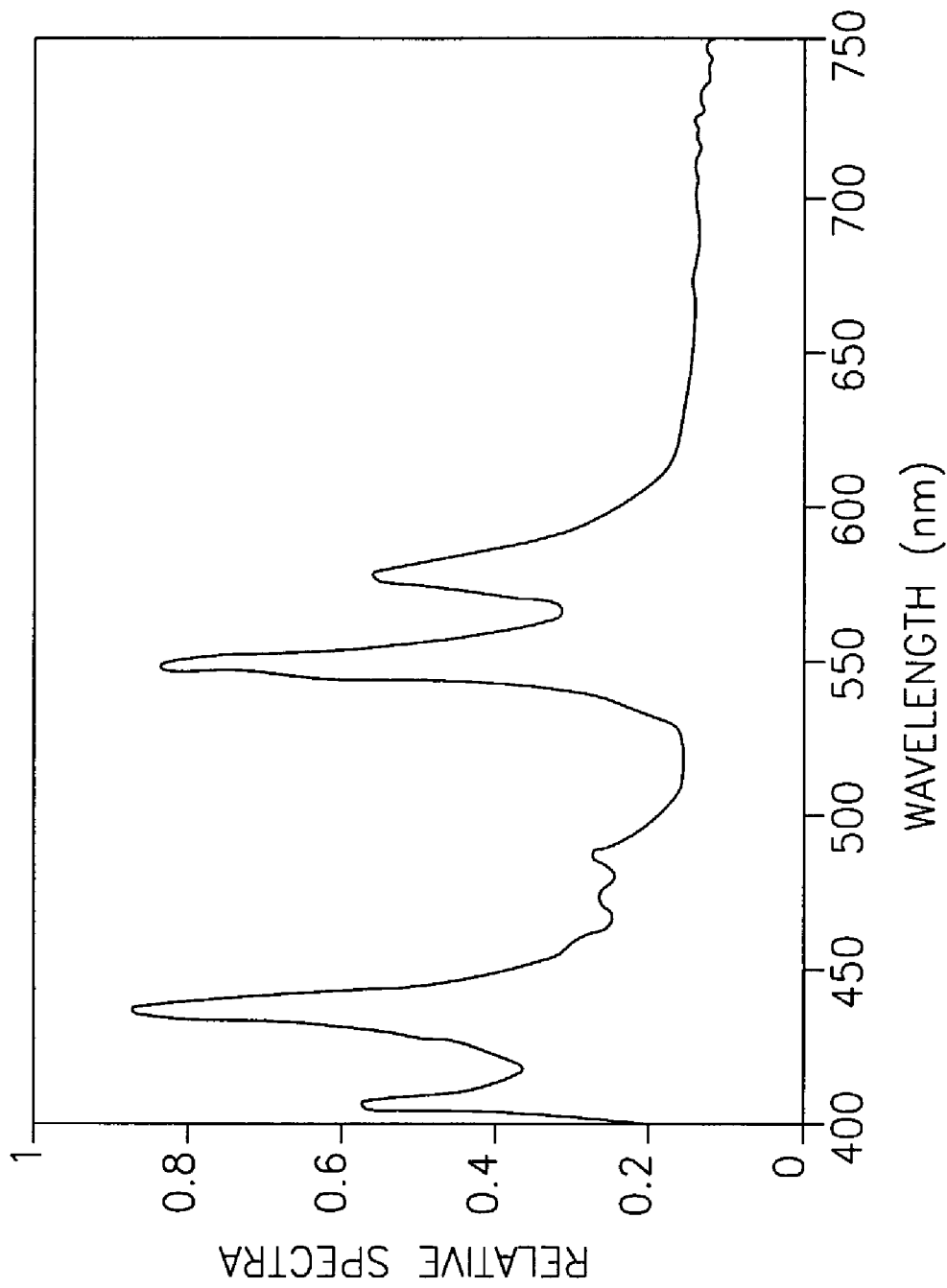
FIG. 2 is a schematic illustration of the spectral output of a conventional high-pressure mercury lamp.

The following description of non-limiting embodiments of the invention relates to a projection display system using a high-pressure mercury lamp, e.g., a UHP™ 100 Watt lamp, available from Philips Lighting, a division of Royal Philips Electronics of Eindhoven, Netherlands ("Philips UHP"), or any other suitable light source having a similar spectral range. FIG. 2 schematically illustrates the spectral output of the Philips UHP lamp. It will be appreciated that other types of high-pressure mercury lamps may have similar spectra and/or similar designs, and therefore the following examples may apply to many other types of lamps, for example, the VIP lamp available from Osram of Berlin, Germany.

The examples herein are described in the context of high-pressure mercury type lamps because such lamps are commonly used in projection display devices. However, other types of light sources, for example, Xenon (Xe) type light sources, as are known in the art, may be used.

Embodiments of monitors and display devices with more than three primaries, in accordance with demonstrative embodiments of the invention, are described in U.S. patent application Ser. No. 09/710,895, entitled "Device, System And Method For Electronic True Color Display", filed Nov. 14, 2000, now U.S. Pat. No. 6,870,523 (Reference 1), and in International Application PCT/IL03/00610, filed Jul. 24, 2003, entitled "High Brightness Wide Gamut Display" and published Jan. 29, 2004 as PCT Publication WO 2004/010407 (Reference 2), the entire disclosures of all of which are incorporated herein by reference.

Figure 3:
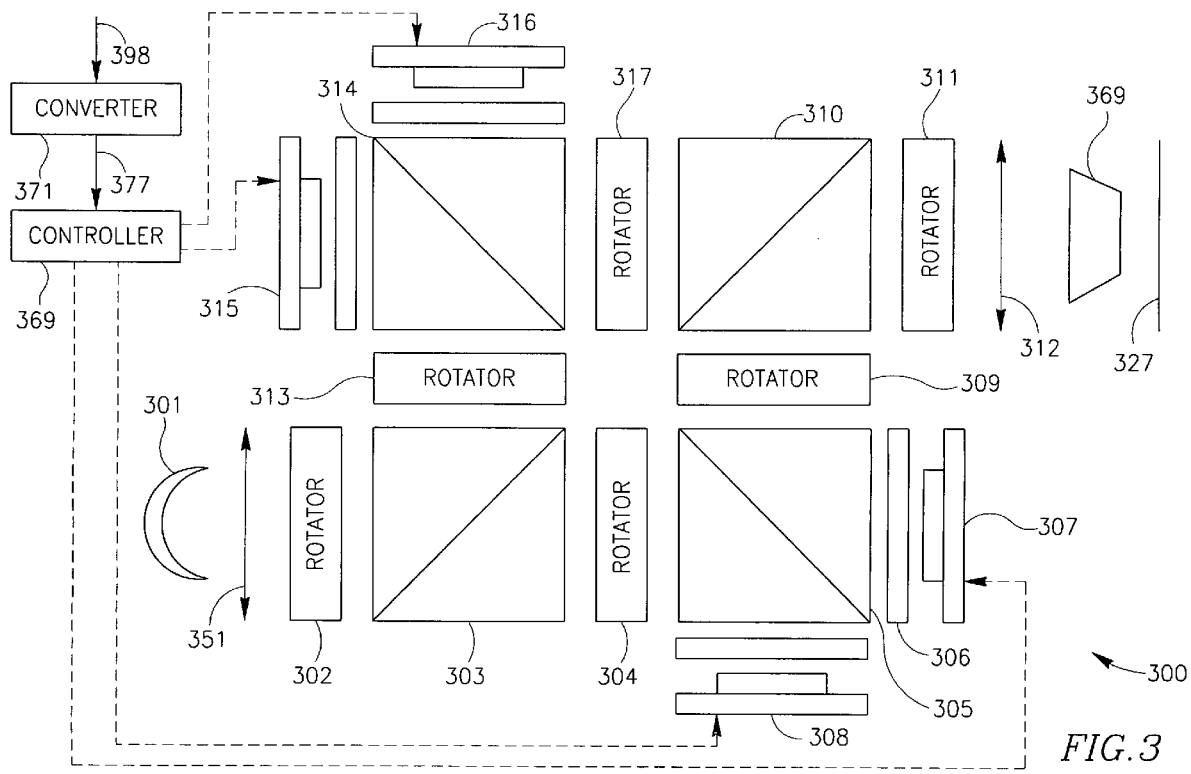
FIG. 3 is a schematic illustration of an optical configuration of a four primary color display device in accordance with some demonstrative embodiments of the invention.

FIG. 3 schematically illustrates an optical configuration of a display device 300 in accordance with some demonstrative embodiments of the invention.

Although the invention is not limited in this respect, the demonstrative configuration of FIG. 3 may be adapted for devices using four reflective Spatial Light Modulators (SLMs), e.g., reflective Liquid Crystal Display (LCD) panels, wherein each panel may produce one primary-color image component, as described below.

According to some demonstrative embodiments of the invention, device 300 may include an illumination unit 301, which may include any suitable polychromatic light source known in the art, e.g., a white light source as described above.

According to some demonstrative embodiments of the invention, device 300 may also include an optical arrangement to selectively split polychromatic light of illumination unit 301 into four primary-color light beams, and to direct the four primary-color light beams to four reflective SLMs, e.g., four reflective LCD panels 307, 308, 315 and 316, respectively, as described below.

It will be appreciated by those skilled in the art that that any other arrangement may be used for producing and/or spatially modulating the four primary-color light beams. For example, any suitable SLM configuration may be used instead of LCD panels 307, 308, 315 and/or 316.

According to some demonstrative embodiments of the invention, device 300 may also include an input polarizer 351 to receive the polychromatic light of illumination unit 301 and to provide polychromatic light in a suitable polarization state, e.g., to produce s-polarized light or p-polarized light. Polarizer 351 may include any suitable element, system, combination and/or arrangement, e.g., including a polarization conversion system, a clean up Polarized Beam Splitter (PBS), a sheet polarizer, and/or a wire-grid polarizer, as are all known in the art.

According to some demonstrative embodiments of the invention, device 300 may also include a first color selective rotator 302 to selectively rotate the polarization of the polychromatic light, and provide a first light beam including light of first and second spectral ranges, e.g., corresponding to first and second primary colors, in a first polarization state; and light of third and fourth spectral ranges, e.g., corresponding to third and fourth primary colors, in a second polarization state, as described below.

Although the invention is not limited in this respect, rotator 302 may receive, for example, polychromatic light, e.g., s-polarized polychromatic light from polarizer 351, and selectively rotate the polarization of a part of the polychromatic light having spectral ranges corresponding to the first and second primary colors, e.g., green and yellow, to the p-polarization state. Rotator 302 may also provide one or more other parts of the polychromatic light, for example, a part of the polychromatic light having spectral ranges corresponding to the third and fourth primary colors, e.g., red and blue, in the second polarization state, e.g., the s-polarization state. Accordingly, the first light beam provided by rotator 302 may include, for example, p-polarized light of a spectral ranges corresponding to the green and yellow primary colors, and s-polarized light of a spectral ranges corresponding to the red and blue primary colors.

Color selective rotator 302 may include any suitable color selective rotator and/or color selective filter, e.g., as are known in the art. For example, rotator 302 may include a green-yellow/red-blue filter, e.g., as is known in the art.

According to some demonstrative embodiments of the invention, device 300 may also include a beam splitter 303 to split the first light beam received from rotator 302 into second and third light beams. The second light beam may include, for example, light of the first and second spectral ranges in the first polarization state. The third light beam may include, for example, light of the third and fourth spectral ranges in the second polarization state. For example, the second light beam may include p-polarized light of spectrums corresponding to the green and yellow primary colors, and the third light beam may include s-polarized light of spectrums corresponding to the red and blue primary colors. Beam splitter 303 may be able, for example, to transmit the second light beam, and to reflect the third light beam, e.g., based on the polarization state of the second and third beams. Splitter 303 may include any suitable beam splitter. For example, splitter 303 may include a PBS able to reflect s-polarized light, and to transmit p-polarized light, e.g., as is known in the art.

According to some demonstrative embodiments of the invention, device 300 may also include a second color selective rotator 304 to selectively rotate the polarization, e.g., to the s-polarization state, of a part of the second light beam having a spectral range corresponding to the first primary color. For example, rotator 304 may be able to rotate the part of the second light beam having a spectral range corresponding to the green primary color. Rotator 304 may also maintain, for example, the polarization state of the part of the second light beam having a spectrum corresponding to the yellow primary color. Accordingly, light provided by rotator 304 may include s-primary light corresponding to the first primary color, e.g. green; and p-polarized light corresponding to the second primary color, e.g., yellow.

Although the invention is not limited in this respect, rotator 304 may also be adapted to perform a skew-ray compensation of the second light beam. For example, rotator 304 may function as a zero-oriented Half Wave Retarder (HWR) with respect to light of the second primary color, e.g., yellow, to produce, for example, a $\lambda/2$ phase shift in the light corresponding to the yellow primary color; and a $\pi/4$-oriented HWR with respect to the light of the first primary color, e.g., green, to produce, for example, a $\lambda/2$ phase shift in the light corresponding to the green primary color.

Rotator 304 may include any suitable optical element, filter, configuration, arrangement, and/or system. For example, rotator 304 may include the green-yellow ColorSelect™ rotator manufactured by ColorLink, Inc., 5335 Sterling Dr Suite B, Boulder, Colo., 80301, USA.

According to some demonstrative embodiments of the invention, device 300 may also include a first beam divider/combiner 305 to split the light from rotator 304, and direct the light of the first spectral range in the second polarization state towards panel 308, and the light of the second spectral range in the first polarization state towards panel 307. Beam divider/combiner 305 may be able, for example, to transmit a first part of the light received from rotator 304 and to reflect a second part of the light received from rotator 304, e.g., based on the polarization state of the first and second parts of the light received from rotator 304. For example, beam divider/combiner 305 may direct a green light beam towards panel 308, e.g., by reflecting the s-polarized light corresponding to the green spectrum; and a yellow light beam towards panel 307, e.g., by transmitting the p-polarized light corresponding to the yellow spectrum. Beam divider/combiner 305 may include any suitable beam splitter. For example, beam divider/combiner 305 may include a PBS able to reflect s-polarized light, and to transmit p-polarized light, e.g., as is known in the art.

According to some demonstrative embodiments of the invention, device 300 may also include a retarder 306 to perform a skew correction to the yellow light beam. For example, retarder 306 may include a zero-oriented retarder having quarter-wave retardation in the yellow spectrum, e.g., as is known in the art.

According to some demonstrative embodiments of the invention, device 300 may also include a third color selective rotator 313 to selectively rotate the polarization, e.g., to the p-polarization state, of a part of the third light beam having a spectral range corresponding to the third primary color. For example, rotator 313 may be able to rotate the part of the third light beam having a spectral range corresponding to the red color. Rotator 313 may also maintain, for example, the polarization state of the part of the third light beam having a spectrum corresponding to the blue primary color. Accordingly, light provided by rotator 313 may include p-polarized light corresponding to the third primary color, e.g., red; and s-primary light corresponding to the fourth primary color, e.g., blue.

Although the invention is not limited in this respect, rotator 313 may also be adapted to perform a skew-ray compensation of the third light beam. For example, rotator 313 may function as a zero-oriented HWR with respect to light of the fourth spectral range, e.g., blue, to produce, for example, a $\lambda/2$ phase shift in the light corresponding to the blue primary color; and a $\pi/4$-oriented HWR with respect to the light of the third spectral range, red, to produce, for example, a $\lambda/2$ phase shift in the light corresponding to the red primary color.

Rotator 313 may include any suitable optical element, filter, configuration, arrangement, and/or system. For example, rotator 313 may include the red-blue ColorSelect™ rotator manufactured by ColorLink, Inc., 5335 Sterling Dr Suite B, Boulder, Colo., 80301, USA.

According to some demonstrative embodiments of the invention, device 300 may also include a second beam divider/combiner 314 to split the light from rotator 313, and direct the light of the third spectral range in the first polarization state, e.g., the p-polarization state, towards panel 316; and the light of the fourth spectral range in the second polarization state, e.g., the s-polarization state, towards panel 315. Beam divider/combiner 314 may be able, for example, to transmit a first part of the light received from rotator 313 and to reflect a second part of the light received from rotator 313, e.g., based on the polarization state of the first and second parts of the light received from rotator 313. For example, beam divider/combiner 314 may direct a blue light beam towards panel 315, e.g., by reflecting s-polarized light corresponding to the blue spectrum; and a red light beam towards panel 316, e.g., by transmitting p-polarized light corresponding to the red spectrum. Beam divider/combiner 314 may include any suitable beam splitter. For example, beam divider/combiner 314 may include a PBS able to reflect s-polarized light, and to transmit p-polarized light, e.g., as is known in the art.

According to some demonstrative embodiments of the invention, one or more of panels 307, 308, 315 and 316 may include an array of pixels, as is known in the art, which may be selectively activated to produce a reflective pattern corresponding to one of a plurality of primary color images. In the example described herein, one or more of panels 307, 308, 315 and/or 316 may be separately activated by a controller 369 to produce a reflective pattern corresponding to one of four independent primary color images, in accordance with an input signal 377 representing a four-primary-color image. Such an input signal may be generated using any of the methods described in Reference 1 and/or Reference 2, e.g., using a converter 371 to convert a three-primary-color image signal 398 into a four-primary-color image signal. Each reflective pattern may modulate a corresponding primary color light beam to produce a corresponding primary color image component.

According to some demonstrative embodiments of the invention, one or more pixels of reflective panels 307, 308, 315 and/or 316, when activated to an "on" state, may reflect polarized light, as is known in the art. Accordingly, pixels of reflective panels 307, 308, 315 and/or 316, when at an "off" state, may substantially block reflectance of polarized light, as is known in the art. Thus, in accordance with these embodiments of the invention, panels 307, 308, 315 and/or 316 may be controlled, e.g., as described above, to produce four modulated primary color light beams, respectively, carrying four, respective, primary color image components. For example, controller 369 may control panel 308 to modulate the first primary color light beam, e.g., the green light beam, to produce a first, e.g., green, modulated light beam; panel 307 to modulate the second primary color light beam, e.g., the yellow light beam, to produce a second, e.g., yellow, modulated light beam; panel 316 to modulate the third primary color light beam, e.g., the red light beam, to produce a third, e.g., red, modulated light beam; and/or panel 315 to modulate the fourth primary color light beam, e.g., the blue light beam, to produce a fourth, e.g., blue, modulated light beam.

According to some demonstrative examples of the invention, panel 307 may be configured to rotate the polarization of the reflected second primary color light beam from p-polarization to s-polarization; panel 308 may be configured to rotate the polarization of the reflected first primary color light beam from s-polarization to p-polarization; panel 316 may be configured to rotate the polarization of the reflected third primary color light beam from p-polarization to s-polarization; and/or panel 315 may be configured to rotate the polarization of the reflected fourth primary color light beam from s-polarization to p-polarization. For example, one or more pixels of panels 308 and/or 316, when activated to an "on" state, may reflect the green and/or red light beams, respectively, while rotating the polarization of the reflected light from s-polarization to p-polarization; and/or one or more pixels of panels 307 and/or 315, when activated to an "on" state, may reflect the yellow and/or blue light beams, respectively, while rotating the polarization of the reflected light from p-polarization to s-polarization.

According to some demonstrative embodiments of the invention, device 300 may also include a fourth color selective rotator 309. Beam divider/combiner 305 may be able to direct both the first and second modulated light beams, e.g., the green and yellow modulated light beams, towards rotator 309. For example, divider/combiner 305 may reflect the s-polarized modulated yellow light beam, and transmit the p-polarized modulated green light beam.

According to some demonstrative embodiments of the invention, rotator 309 may selectively rotate the polarization of the first modulated light beam, e.g., the green modulated light beam, to the second polarization state, e.g., the s-polarization state. Rotator 309 may include any suitable color selective rotator or filter, e.g., a green-yellow ColorSelect™ rotator manufactured by ColorLink, Inc., 5335 Sterling Dr Suite B, Boulder, Colo., 80301, USA.

According to some demonstrative embodiments of the invention, device 300 may also include a fifth color selective rotator 317. Beam divider/combiner 314 may be able to direct both the third and fourth modulated light beams, e.g., the red and blue modulated light beams, towards rotator 317. For example, divider/combiner 314 may reflect the s-polarized modulated red light beam, and transmit the p-polarized modulated blue light beam.

According to some demonstrative embodiments of the invention, rotator 317 may selectively rotate the polarization of the third modulated light beam, e.g., the blue modulated light beam, to the first polarization state, e.g., the p-polarization state. Rotator 317 may include any suitable color selective rotator or filter, e.g., a red-blue ColorSelect™ rotator manufactured by ColorLink, Inc., 5335 Sterling Dr Suite B, Boulder, Colo., 80301, USA.

According to some demonstrative embodiments of the invention, device 300 may also include a beam combiner 310 to direct the first, second, third and/or fourth modulated light beams in an output direction, e.g., towards a projection lens 369. For example, beam combiner may reflect the s-polarized first and second primary color modulated light beams, e.g., the s-polarized modulated green and yellow light beams; and transmit the p-polarized third and fourth modulated light beams, e.g., the p-polarized modulated red and blue light beams. Beam combiner 310 may include any suitable beam combiner, e.g., a PBS.

According to some demonstrative embodiments of the invention, device 300 may also include a sixth color selective rotator 311 to selectively rotate the one or more of the modulated light beams, e.g., such that all four modulated light beams have the same polarization. For example, rotator 311 may rotate the polarization of the red and blue light beams from p-polarization to s-polarization. Alternatively, rotator 311 may rotate the polarization of the green and yellow light beams from s-polarization to p-polarization.

Color selective rotator 31 may include any suitable color selective rotator and/or color selective filter, e.g., as are known in the art. For example, rotator 311 may include a green-yellow/red-blue filter, e.g., as is known in the art.

According to some demonstrative embodiments of the invention, device 300 may also include a clean-up polarizer 312, e.g., to enhance contrast as is known in the art.

According to some demonstrative embodiments of the invention, projection lens 369 may include any suitable projection lens, e.g., as is known in the art, to project the first, second, third, and/or fourth modulated light beams onto a screen 327.

Figure 4:
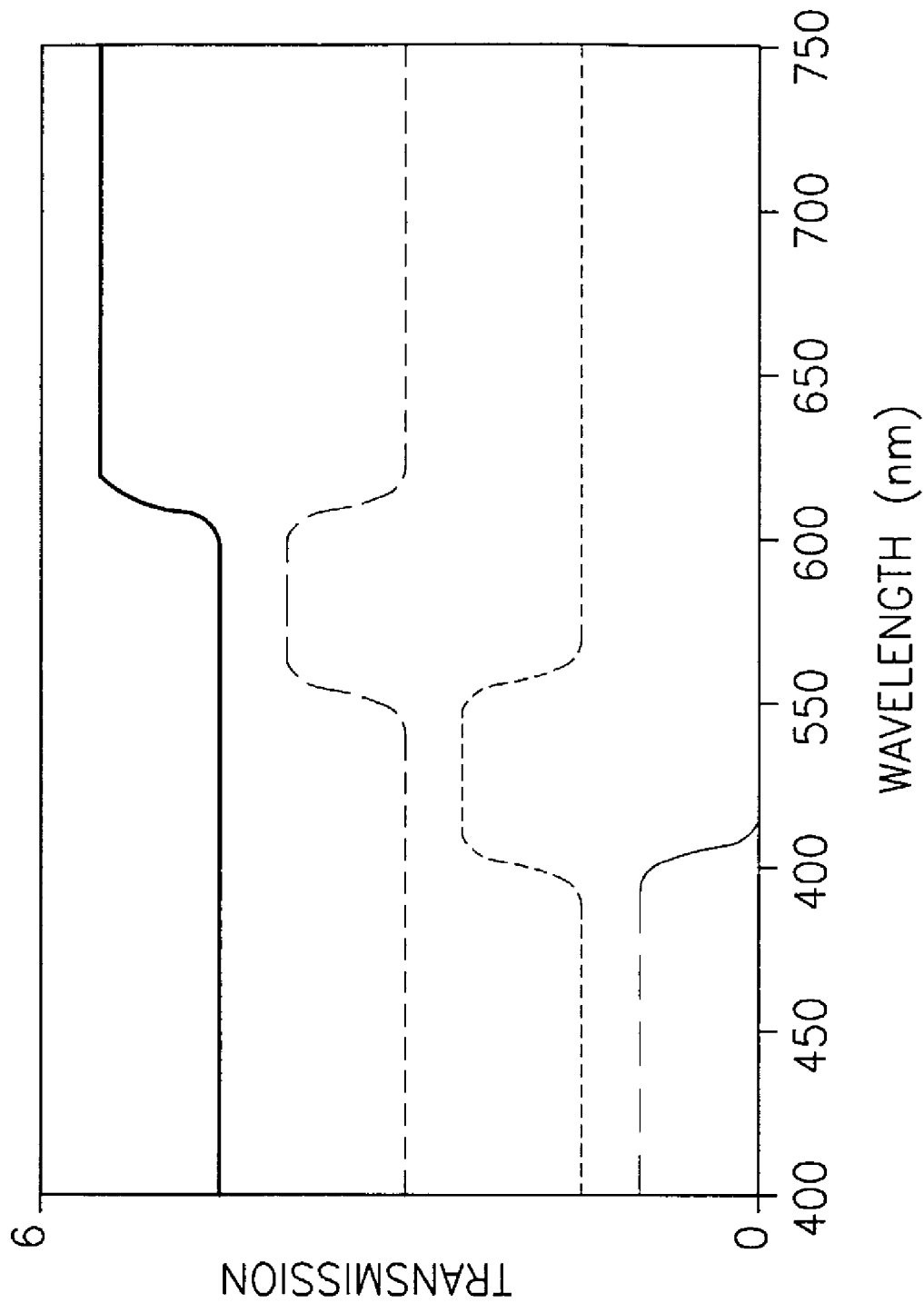
FIG. 4 is a schematic illustration of graphs of four demonstrative primary color wavelength spectra, which may be implemented by the display device of FIG. 3.

FIG. 4 schematically illustrates graphs of four exemplary primary color wavelength spectra, which may be implemented by the color display of FIG. 3.

FIG. 4 shows the wavelength spectra of a set of four primary colors which may correspond, for example, to the first, second, third and/or fourth spectral ranges, respectively, implemented by filters 302, 304, 313, 309, 317, and/or 311.

According to some demonstrative embodiments of the invention, the specific color choices of the primary color wavelength ranges shown in FIG. 4 may result in significantly wider color gamut and/or image brightness, compared to prior art RGB color display devices, as described below.

Figure 5:
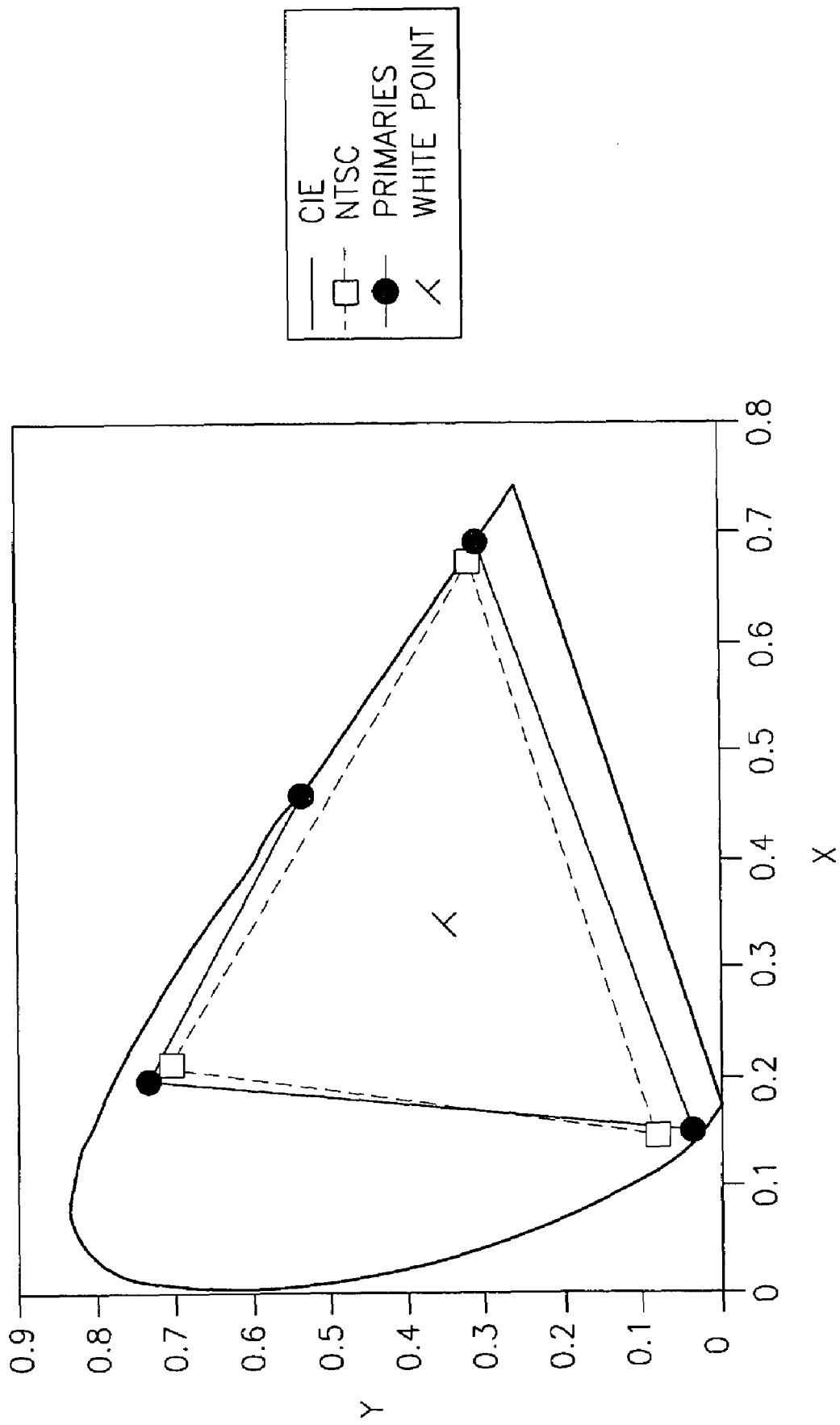
FIG. 5 is a schematic illustration of a chromaticity diagram representing a color gamut resulting from the primary color spectra of FIG. 4.

FIG. 5 schematically illustrates a chromaticity diagram representing the resulting color gamut of the primary color spectra of FIG. 4.

As clearly shown in FIG. 5, the color gamut produced by a theoretical NTSC gamut display is substantially covered by the gamut of the four primary colors of FIG. 4. As further shown in FIG. 5, the white point coordinates obtained by the sum of all primaries are x=0.313 and y=0.329. The luminance values for the colors obtained by this configuration are in general equal to or higher than the luminance values that can be obtained for the same colors from a theoretical NTSC gamut display. Thus, in general, all the colors that can be reproduced by a theoretical NTSC gamut display are also reproducible by the primary color selections of FIG. 5, both in terms of color coordinates and in terms of intensity.

It should be appreciated that although the primary color selections of FIG. 4 provide desirable results in terms of image color and brightness, there may be other suitable selections of four primary colors that provide similar (or even better) results, in accordance with specific implementations.

Some demonstrative embodiments of the invention may relate to methods and/or devices of displaying a color image using four primary colors, e.g., as described above with reference to FIGS. 3-5. However, it will be appreciated by those of ordinary skill in the art that other embodiments of the invention may be implemented for displaying a color image using-more than four primary colors. For example, it will be appreciate by those skilled in the art that the device of FIG. 3 may be modified to enable displaying a color image using five or more primary colors, e.g., by adding one or more color selective rotators and/or one or more reflective SLM panels.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A display device of producing a color image using four or more primary colors, the device comprising:

a first color selective rotator to selectively rotate the polarization of polychromatic light, and provide a first light beam including light of first and second spectral ranges in a first polarization state, and light of third and fourth spectral ranges in a second polarization state, said first, second, third and fourth spectral ranges corresponding to first, second third and fourth primary colors, respectively;

a beam splitter to split said first light beam into a second light beam including light of said first and second spectral ranges in said first polarization state, and a third light beam including light of said third and fourth spectral ranges in said second polarization state;

a second color selective rotator to selectively rotate the polarization of said second light beam to include light of said first spectral range in said second polarization state, and light of said second spectral range in said first polarization state;

first and second reflective spatial light modulator panels including first and second arrays of pixel elements, respectively;

a first beam divider/combiner to direct the light of said first spectral range in said second polarization state towards said first reflective panel, and the light of said second spectral range in said first polarization state towards said second reflective panel;

a third color selective rotator to selectively rotate the polarization of said third light beam to include light of said third spectral range in said first polarization state, and light of said fourth spectral range in said second polarization state;

third and fourth reflective spatial light modulator panels including third and fourth arrays of pixel elements, respectively; and a second beam divider/combiner to direct the light of said third spectral range in said first polarization state towards said third reflective panel, and the light of said fourth spectral range in said second polarization state towards said fourth reflective panel.

2. The device of claim 1, wherein said first reflective panel is able to modulate the light of said first spectral range in said second polarization state and reflect a first modulated light beam in said first polarization state carrying a first primary color image component of said color image; said second reflective panel is able to modulate the light of said second spectral range in said first polarization state and reflect a second modulated light beam in said second polarization state carrying a second primary color image component of said color image; said third reflective panel is able to modulate the light of said third spectral range in said first polarization state and reflect a third modulated light beam in said second polarization state carrying a third primary color image component of said color image; and said fourth reflective panel is able to modulate the light of said fourth spectral range in said second polarization state and reflect a fourth modulated light beam in said first polarization state carrying a fourth primary color image component of said color image.

3. The device of claim 2 comprising a fourth color selective rotator, wherein said first beam divider/combiner is able to direct both said first and second modulated light beams towards said fourth rotator, and wherein said fourth rotator is able to selectively rotate the polarization of said first modulated light beam to said second polarization state.

4. The device of claim 3 comprising a fifth color selective rotator, wherein said second beam divider/combiner is able to direct both said third and fourth modulated light beams towards said fifth rotator, and wherein said fifth rotator is able to selectively rotate the polarization of said third modulated light beam to said first polarization state.

5. The device of claim 4 comprising a beam combiner to direct said first, second, third and fourth modulated light beams in an output direction.

6. The device of claim 5 comprising a sixth color selective rotator to rotate the polarization of two of said first, second, third, and fourth modulated light beams.

7. The device of claim 1, wherein at least one of said first and second beam divider/combiner comprises a polarized beam splitter.

8. The device of claim 1, wherein each of said first, second, third, and fourth primary colors comprises a corresponding one of green, yellow, red and blue primary colors.

9. The device of claim 1 comprising a projection lens to project said first, second, third and fourth modulated light beams towards a screen.

10. The device of claim 1 comprising a controller to separately activate each of said four or more spatial light modulators to produce four or more respective reflective patterns corresponding to four or more primary components, respectively, of a signal representing said color image.

11. The device of claim 10 comprising a converter to convert a three-primary color input signal into the signal representing said color image.

12. A method of producing a color image using four or more primary colors comprising:
    selectively rotating the polarization of polychromatic light to provide a first light beam including light of first and second spectral ranges in a first polarization state, and light of third and fourth spectral ranges in a second polarization state, said first, second, third and fourth spectral ranges corresponding to first, second third and fourth primary colors, respectively;
    splitting said first light beam into a second light beam including the light of said first and second spectral ranges in said first polarization state, and a third light beam including the light of said third and fourth spectral ranges in said second polarization state;
    selectively rotating the polarization of said second light beam to include light of said first spectral range in said second polarization state, and light of said second spectral range in said first polarization state;
    directing the light of said first spectral range in said second polarization state towards a first reflective panel, and the light of said second spectral range in said first polarization towards a second reflective panel;
    selectively rotating the polarization of said third light beam to include light of said third spectral range in said first polarization state, and light of said fourth spectral range in said second polarization state; and
    directing the light of said third spectral range in said first polarization state towards a third reflective panel, and the light of said fourth spectral range in said second polarization state towards a fourth reflective panel.

13. The method of claim 12 comprising:
    modulating the light of said first spectral range in said second polarization state, and reflecting a first modulated light beam in said first polarization state carrying a first primary color image component of said color image;
    modulating the light of said second spectral range in said first polarization state and reflecting a second modulated light beam in said second polarization state carrying a second primary color image component of said color image;

modulating the light of said third spectral range in said first polarization state and reflecting a third modulated light beam in said second polarization state carrying a third primary color image component of said color image; and modulating the light of said fourth spectral range in said second polarization state and reflecting a fourth modulated light beam in said first polarization state carrying a fourth primary color image component of said color image.

14. The method of claim 13 comprising selectively rotating the polarization of said first modulated light beam to said second polarization state.

15. The method of claim 14 comprising selectively rotating the polarization of said third modulated light beam to said first polarization state.

16. The method of claim 15 comprising directing said first, second, third and fourth modulated light beams in an output direction.

17. The device of claim 16 comprising selectively rotating the polarization of two of said first, second, third, and fourth modulated light beams.

18. The method of claim 12, wherein each of said first, second, third, and fourth primary colors comprises a corresponding one of green, yellow, red and blue primary colors.

19. The method of claim 12 comprising projecting said first, second, third and fourth modulated light beams towards a screen.

* * * * *